(12) United States Patent
Ishikawa et al.

(10) Patent No.: US 11,598,410 B2
(45) Date of Patent: Mar. 7, 2023

(54) DRIVE DEVICE

(71) Applicant: Nidec Corporation, Kyoto (JP)

(72) Inventors: Yuki Ishikawa, Kyoto (JP); Keisuke Nakata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/515,801

(22) Filed: Nov. 1, 2021

(65) Prior Publication Data

US 2022/0154814 A1 May 19, 2022

(30) Foreign Application Priority Data

Nov. 19, 2020 (JP) .............................. JP2020-192826

(51) Int. Cl.
*F16H 57/04* (2010.01)
*F16H 57/021* (2012.01)
*F16H 57/02* (2012.01)

(52) U.S. Cl.
CPC ......... *F16H 57/045* (2013.01); *F16H 57/021* (2013.01); *F16H 57/0424* (2013.01); *F16H 57/0471* (2013.01); *F16H 2057/02034* (2013.01)

(58) Field of Classification Search
CPC .. F16H 57/045; F16H 57/021; F16H 57/0424; F16H 57/0471; F16H 2057/02034; F16H 57/0457; F16H 57/0423
See application file for complete search history.

(56) References Cited

U.S. PATENT DOCUMENTS

| | | | | |
|---|---|---|---|---|
| 3,529,698 A * | 9/1970 | Nelson | ................ | F16H 57/0447 184/6.12 |
| 4,347,759 A * | 9/1982 | Renk | ......................... | F16N 7/28 74/606 R |
| 4,470,324 A * | 9/1984 | Renk | .................... | F16H 57/0423 74/606 R |
| 7,213,682 B2 * | 5/2007 | Gibson | ............... | F16H 57/0421 184/6.12 |
| 7,775,528 B2 * | 8/2010 | Berdichevsky | ...... | F16J 15/3244 277/559 |
| 8,657,073 B2 * | 2/2014 | Matsumoto | ......... | F16H 57/0483 184/6.12 |
| 8,899,381 B2 * | 12/2014 | Ebihara | ............... | F16H 57/0483 184/6.12 |
| 9,772,027 B2 * | 9/2017 | Preston | ............... | F16H 57/0457 |
| 10,746,282 B2 * | 8/2020 | Ito | ........................... | F16H 48/08 |
| 10,767,752 B2 * | 9/2020 | Kawai | .................... | F16H 57/029 |
| 10,859,152 B2 * | 12/2020 | Yu | ......................... | F16H 57/0475 |
| 10,955,041 B2 * | 3/2021 | Smith | .................. | F16H 57/0495 |

(Continued)

*Primary Examiner* — Michael A Riegelman
(74) *Attorney, Agent, or Firm* — Keating & Bennett

(57) ABSTRACT

A drive device includes a first catch tank above a first gear and including a first bent portion bent between the first gear and a second gear, and a second catch tank below the first catch tank and including a second bent portion that is bent downward. A space above the second bent portion communicates with a space above the first bent portion. A third catch tank is above the second gear, and includes a third bent portion that is bent toward between the first gear and the second gear. A space above the third bent portion communicates with the space above the first bent portion. A fourth catch tank is in front of the second gear and above the third gear, and includes a fourth bent portion that is bent downward.

17 Claims, 15 Drawing Sheets

(56) References Cited

U.S. PATENT DOCUMENTS

| | | | |
|---|---|---|---|
| 11,149,838 B2* | 10/2021 | Hagino | .................... F01M 9/06 |
| 11,274,738 B2* | 3/2022 | Smith | ................. F16H 57/0423 |
| 2006/0231337 A1* | 10/2006 | Vogeltanz | ................. F16N 7/36 |
| | | | 184/6 |
| 2015/0152954 A1* | 6/2015 | Kajikawa | ............ F16H 57/0457 |
| | | | 74/467 |
| 2016/0153546 A1* | 6/2016 | Ogawa | ................ F16H 57/0457 |
| | | | 74/665 F |
| 2019/0229582 A1* | 7/2019 | Ito | ......................... B60K 11/02 |
| 2022/0154814 A1* | 5/2022 | Ishikawa | ............ F16H 57/0471 |

\* cited by examiner

DRIVE DEVICE

CROSS-REFERENCE TO RELATED APPLICATIONS

The present application claims priority under 35 U.S.C. § 119 to Japanese Patent Application No. 2020-192826 filed on Nov. 19, 2020, the entire contents of which are hereby incorporated herein by reference.

1. Field of the Invention

The present disclosure relates to a drive device.

2. Background

Conventionally, a drive device including a motor and a gear in a housing is known. As such a drive device, a drive device having a catch tank in which a portion of oil stored in a housing is stored during driving is known.

In such a drive device, when a gear scrapes up the oil during driving, an amount of oil in which a portion of the gear is immersed can be reduced. Accordingly, it is possible to reduce a stirring loss when the oil is stirred by the gear.

SUMMARY

An example embodiment of a drive device according to the present disclosure includes a motor including a rotor rotatable about a motor axis extending along a first direction, a power transmission including a first gear, a second gear that meshes with the first gear, and a third gear that is connected to the motor to transmit a rotational driving force of the motor to the second gear, and a housing that houses the motor and the power transmission. A direction perpendicular to the first direction is defined as a second direction, and a direction perpendicular to the first direction and the second direction is defined as a third direction. The first gear and the third gear are side by side in the second direction. The third gear is on a first side of the first gear in the second direction. The second gear is between the first gear and the third gear in the second direction, and on a first side of the first gear in the third direction.

The housing includes a first catch tank on the first side of the first gear in the third direction, a second catch tank on a second side of the first catch tank in the third direction, a third catch tank on the first side of the second gear in the third direction, and a fourth catch tank on the first side of the second gear in the second direction and on the first side of the third gear in the third direction.

The first catch tank includes a first bent portion that is bent toward between the first gear and the second gear. The second catch tank includes a second bent portion that is bent toward the second side in the third direction. The third catch tank includes a third bent portion that is bent toward between the first gear and the second gear. The fourth catch tank includes a fourth bent portion that is bent toward the second side in the third direction. A space on the first side of the second bent portion in the third direction communicates with a space on the first side of the first bent portion in the third direction. A space on the first side of the third bent portion in the third direction communicates with the space on the first side of the first bent portion in the third direction. A space on the first side of the fourth bent portion in the third direction communicates with the space on the first side of the third bent portion in the third direction.

An oil storage portion in which oil is stored is provided in the housing at a portion of the housing on the second side in the third direction. A portion of the first gear on the second side in the third direction is housed in the oil storage portion. The space on the first side of the first bent portion in the third direction communicates with the oil storage portion.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings.

The accompanying drawings may have, as appropriate, an XYZ coordinate system as a three-dimensional orthogonal coordinate system. In the XYZ coordinate system, the Y-axis direction (first direction) indicates a direction in which a motor axis MJ of a motor 2 extends, and is simply referred to by the term "axial direction" or "axially". The +Y direction indicates a first side in the axial direction (first side in the first direction), and the −Y direction indicates a second side in the axial direction (second side in the first direction). In addition, the X-axis direction (second direction) is a direction orthogonal to the Y-axis direction, and indicates a front-rear direction of the drive device 1. The +X direction indicates a front side (first side in the second direction), and the −X direction indicates a rear side (second side in the second direction). The X-axis direction is a direction in which a first gear 311 and a third gear 341 to be described later are arranged side by side. The Z-axis direction (third direction) is a direction orthogonal to the X-axis direction and the Y-axis direction. The +Z direction (first side in the third direction) indicates an upper side (a side opposite to the direction of gravitational force), and the −Z direction (second side in the third direction) indicates a lower side (the direction of gravitational force). Basically, the +X direction corresponds to the front side of a vehicle equipped with a drive device 1, and the −X direction corresponds to the rear side of the vehicle. However, the +X direction may correspond to the rear side of the vehicle, and the −X direction may correspond to the front side of the vehicle. That is, the front-rear direction of the drive device 1 does not necessarily coincide with the front-rear direction of the vehicle.

A radial direction orthogonal to the motor axis MJ of the motor 2 is simply referred to as a "radial direction", and a circumferential direction around the motor axis MJ is simply referred to as a "circumferential direction".

Figure 1:
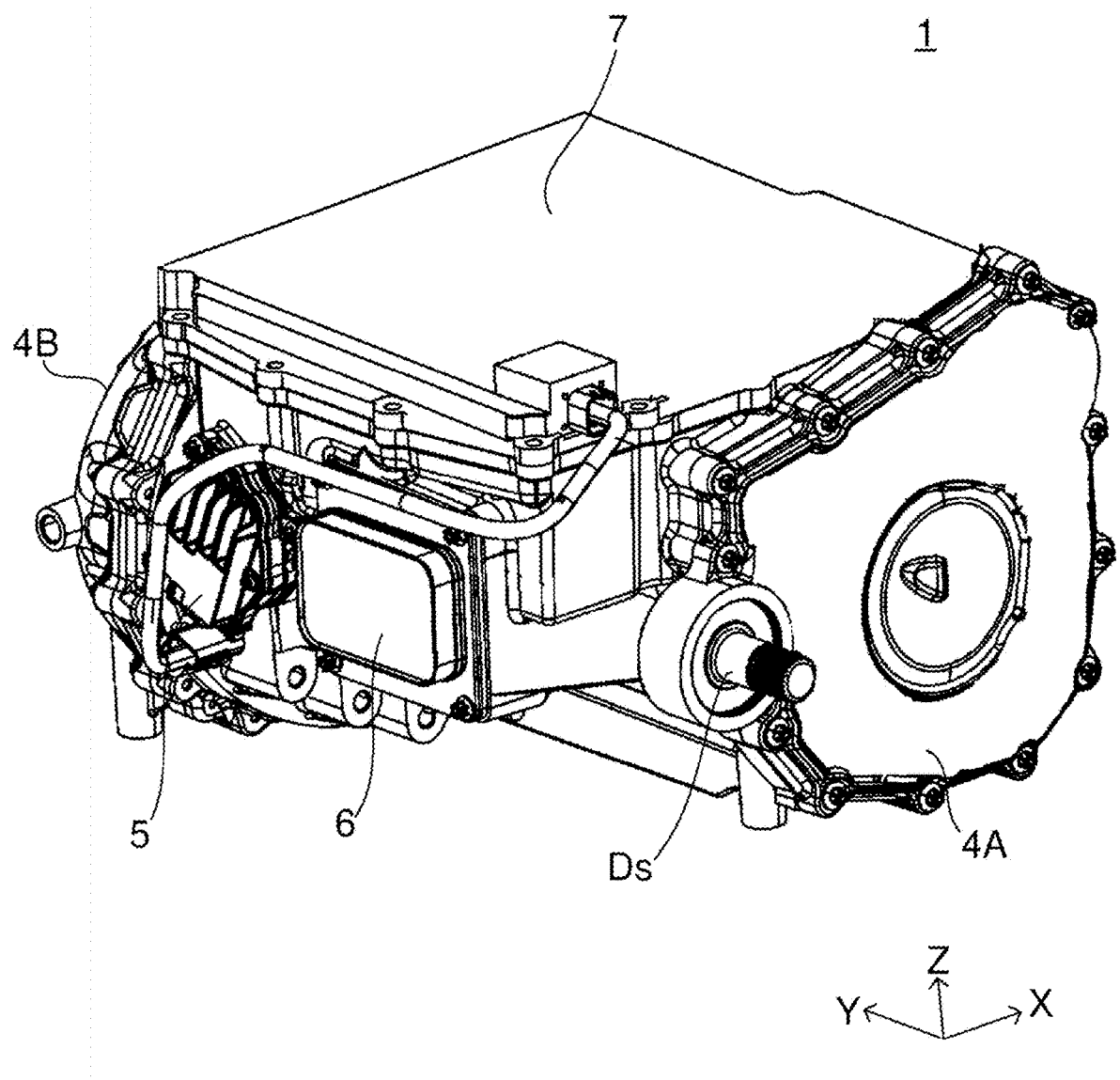
FIG. 1 is an external perspective view of a drive device according to an example embodiment of the present disclosure.
Figure 2:
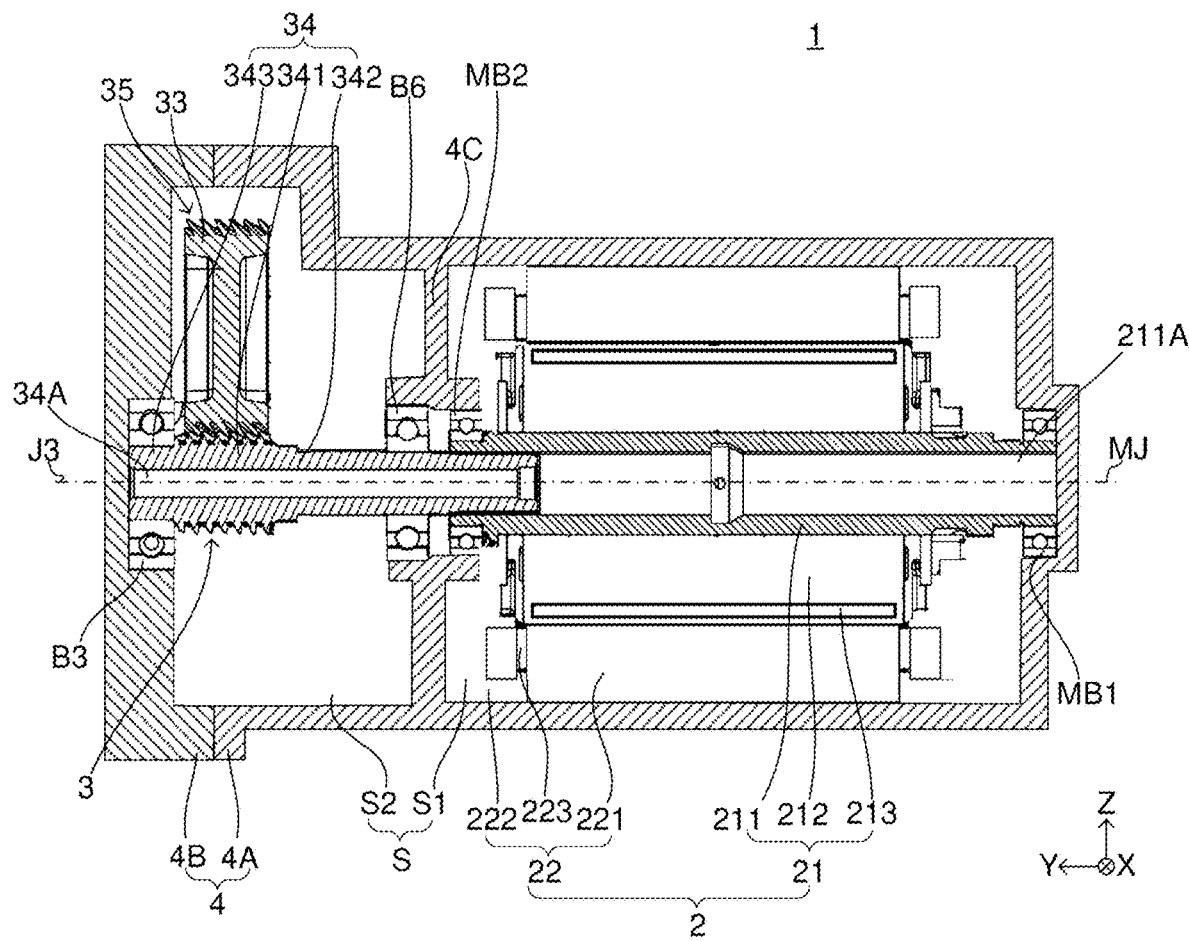
FIG. 2 is a cross-sectional view taken along a plane perpendicular to a front-rear direction of the drive device.
Figure 3:
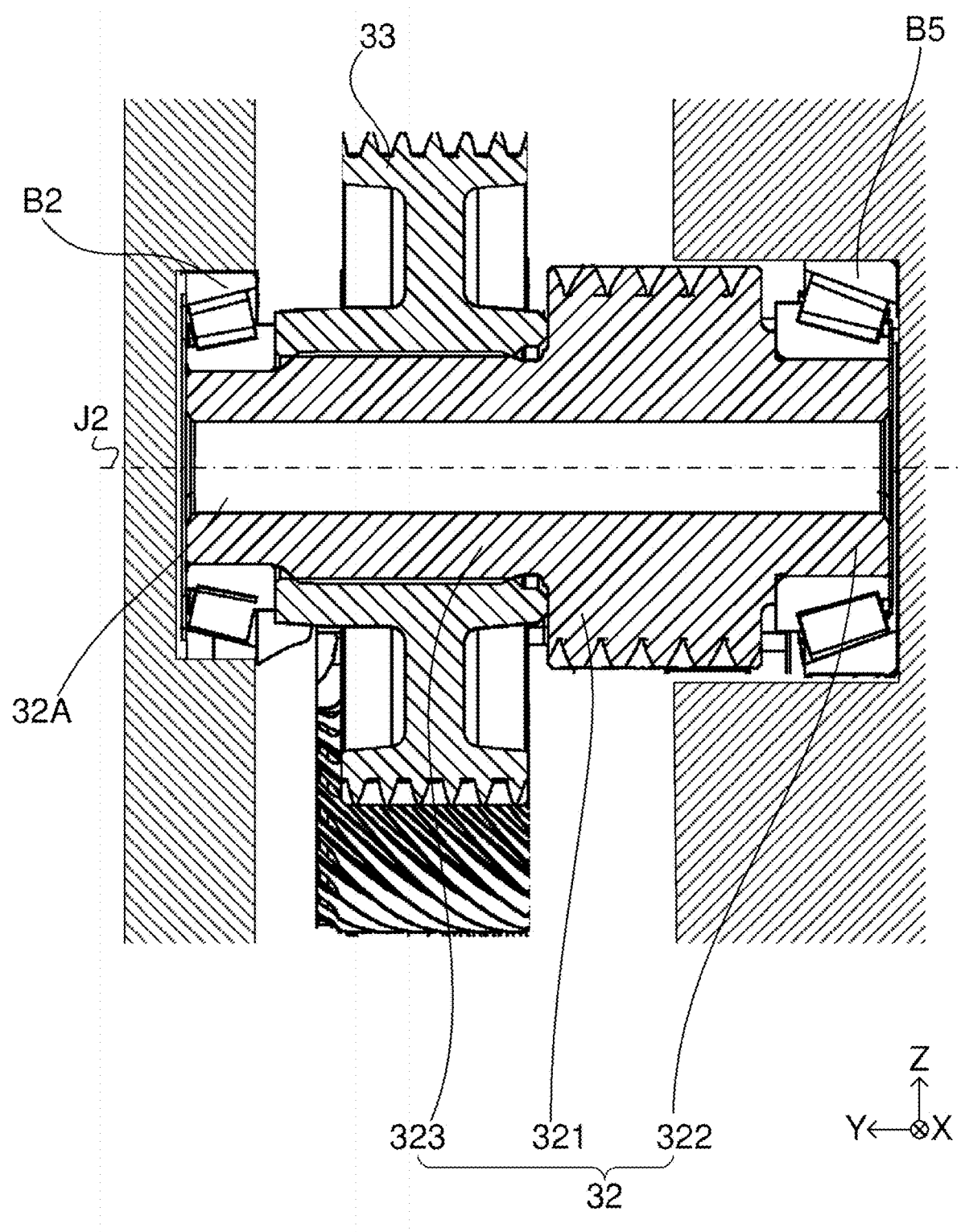
FIG. 3 is a partial cross-sectional view taken along a plane perpendicular to the front-rear direction of the drive device.
Figure 4:
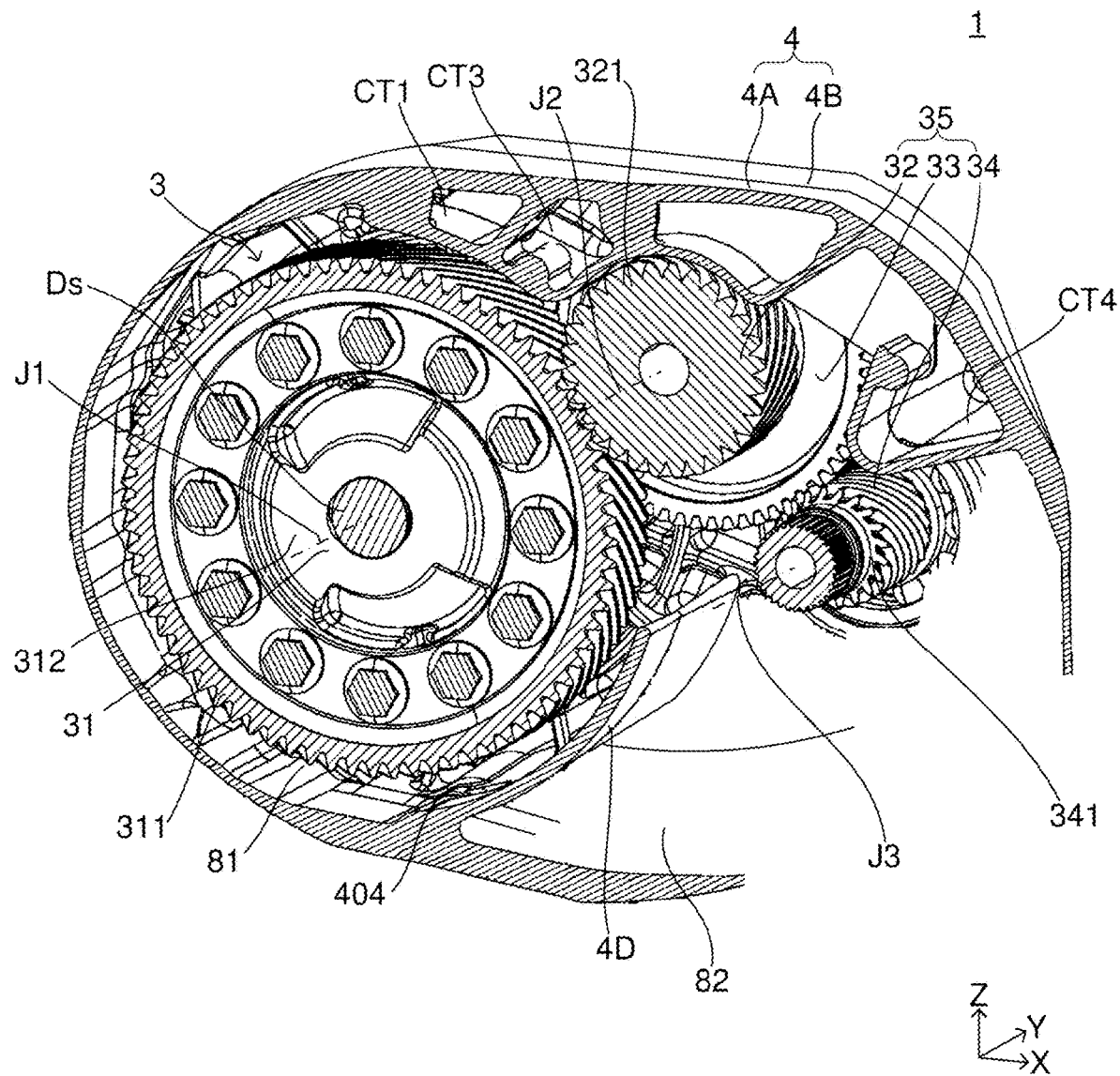
FIG. 4 is a perspective view, partially in cross section, taken along a plane perpendicular to an axial direction of the drive device.

The drive device 1 according to the present example embodiment of the present disclosure will be described below with reference to the drawings. FIG. 1 is an external perspective view of the drive device 1. FIGS. 2 and 3 are cross-sectional views taken along a plane perpendicular to the front-rear direction of the drive device 1. FIG. 2 is a cross-sectional view taken along a plane including the motor axis MJ of the motor 2, and FIG. 3 is a partial cross-sectional view taken along a plane including a second rotation axis J2 of a second gear 321. FIG. 4 is a perspective view, partially in cross section, taken along a plane perpendicular to an axial direction of the drive device 1. Note that FIG. 4 is a diagram of the drive device 1 as viewed toward a first side in the axial direction from a second side in the axial direction.

The drive device 1 is mounted to a vehicle that uses at least a motor as a power source, such as a hybrid electric vehicle (HEV), a plug-in hybrid vehicle (PHV), or an electric vehicle (EV). The drive device 1 is used as a power source of the vehicles described above.

As illustrated in FIGS. 1 to 4, the drive device 1 includes the motor 2, a power transmission 3, a housing 4, an oil pump 5, an oil cooler 6, and an inverter unit 7.

As illustrated in FIG. 2, the motor 2 includes a rotor 21 that rotates about the motor axis MJ extending along the axial direction (first direction), and a stator 22 located outside the rotor 21 in the radial direction.

The housing 4 includes a motor housing 4A and a gear housing 4B (FIGS. 1 and 2). The gear housing 4B is disposed on the first side of the motor housing 4A in the axial direction. The gear housing 4B is fixed to the motor housing 4A with a bolt. A housing space S is provided inside the housing 4 in a state where the motor housing 4A and the gear housing 4B are combined (FIG. 2). The housing space S is partitioned into a first housing portion S1 that houses the motor 2 and a second housing portion S2 that houses the power transmission 3. The first housing portion S1 is provided inside the motor housing 4A. The second housing portion S2 includes an internal space on the first side of the motor housing 4A in the axial direction and an internal space of the gear housing 4B. In this manner, the housing 4 houses the motor 2 and the power transmission 3 therein.

Each unit constituting the drive device 1 will be described below in detail.

As illustrated in FIG. 2, the motor 2 includes the rotor 21 and the stator 22. The rotor 21 rotates when electric power is supplied to the stator 22 from a battery (not shown). The rotor 21 includes a motor shaft 211, a rotor core 212, and a rotor magnet 213. The rotor 21 rotates around the motor axis MJ.

The motor shaft 211 extends in the axial direction about the motor axis MJ. The motor shaft 211 is a hollow shaft having a hollow portion 211A extending in the axial direction.

A first motor bearing MB1 is held at an end of the motor housing 4A on the second side in the axial direction. An end of the motor shaft 211 on the second side in the axial direction is supported by the first motor bearing MB1 in a rotatable manner. A second motor bearing MB2 is held by a housing wall portion 4C disposed at an intermediate position of the motor housing 4A in the axial direction. An end of the motor shaft 211 on the first side in the axial direction is supported by the second motor bearing MB2 in a rotatable manner.

The rotor core 212 is obtained by stacking magnetic steel sheets. The rotor core 212 is a columnar body extending along the axial direction. Multiple rotor magnets 213 are fixed to the rotor core 212. The multiple rotor magnets 213 are arranged along the circumferential direction such that magnetic poles are arranged alternately.

The stator 22 surrounds the rotor 21 from outside in the radial direction. That is, the motor 2 is an inner rotor motor in which the rotor 21 is disposed inside the stator 22 so as to be rotatable. The stator 22 includes a stator core 221, a coil 222, and an insulator 223 disposed between the stator core 221 and the coil 222. The stator 22 is held by the motor housing 4A. The stator core 221 has a plurality of teeth protruding inward in the radial direction from an inner peripheral surface of an annular yoke.

One or a plurality of coil wires are passed between the teeth. The coil wire disposed between the teeth constitutes the coil 222. The coil wire is electrically connected to the inverter unit 7 (FIG. 1). The coil 222 includes coil ends protruding from end surfaces of the stator core 221 in the axial direction.

The power transmission 3 transmits rotational driving force of the motor 2. The rotational driving force is transmitted to drive shafts Ds (FIG. 1) that drive wheels of the vehicle by the power transmission 3.

The power transmission 3 includes a differential 31, a reduction gear 35, a first bearing B1, a second bearing B2, a third bearing B3, a fourth bearing (not shown), a fifth bearing B5, and a sixth bearing B6. In the present example embodiment, the third and sixth bearings are ball bearings, and the first, second, fourth, and fifth bearings are roller bearings. However, the first to sixth bearings may be of other types such as a sleeve bearing. One type of bearing may be used, or three or more types of bearings may be combined.

The differential 31 (FIG. 4) is mounted to the drive shafts Ds of the vehicle. The differential 31 transmits the rotational driving force of the motor 2 to the drive shafts Ds. The drive shafts Ds are disposed each on the first side and the second side of the differential 31 in the axial direction for left and right wheels. FIGS. 1 and 4 illustrate the drive shaft Ds on the second side in the axial direction. The differential 31 has a function of transferring the same torque to the left and right drive shafts while absorbing a difference in speed between the left and right wheels (drive shafts) when, for example, the vehicle is turning.

The differential 31 includes a first gear 311, a gear housing 312, a pair of pinion gears (not shown), a pinion shaft (not shown), and a pair of side gears (not shown).

That is, the power transmission 3 includes the first gear 311. The first gear 311 is a ring gear, and rotates about a first rotation axis J1 extending in the axial direction (FIG. 4). The first gear 311 is disposed side by side in the front-rear direction (second direction) together with the third gear 341 to be described later.

Figure 9:
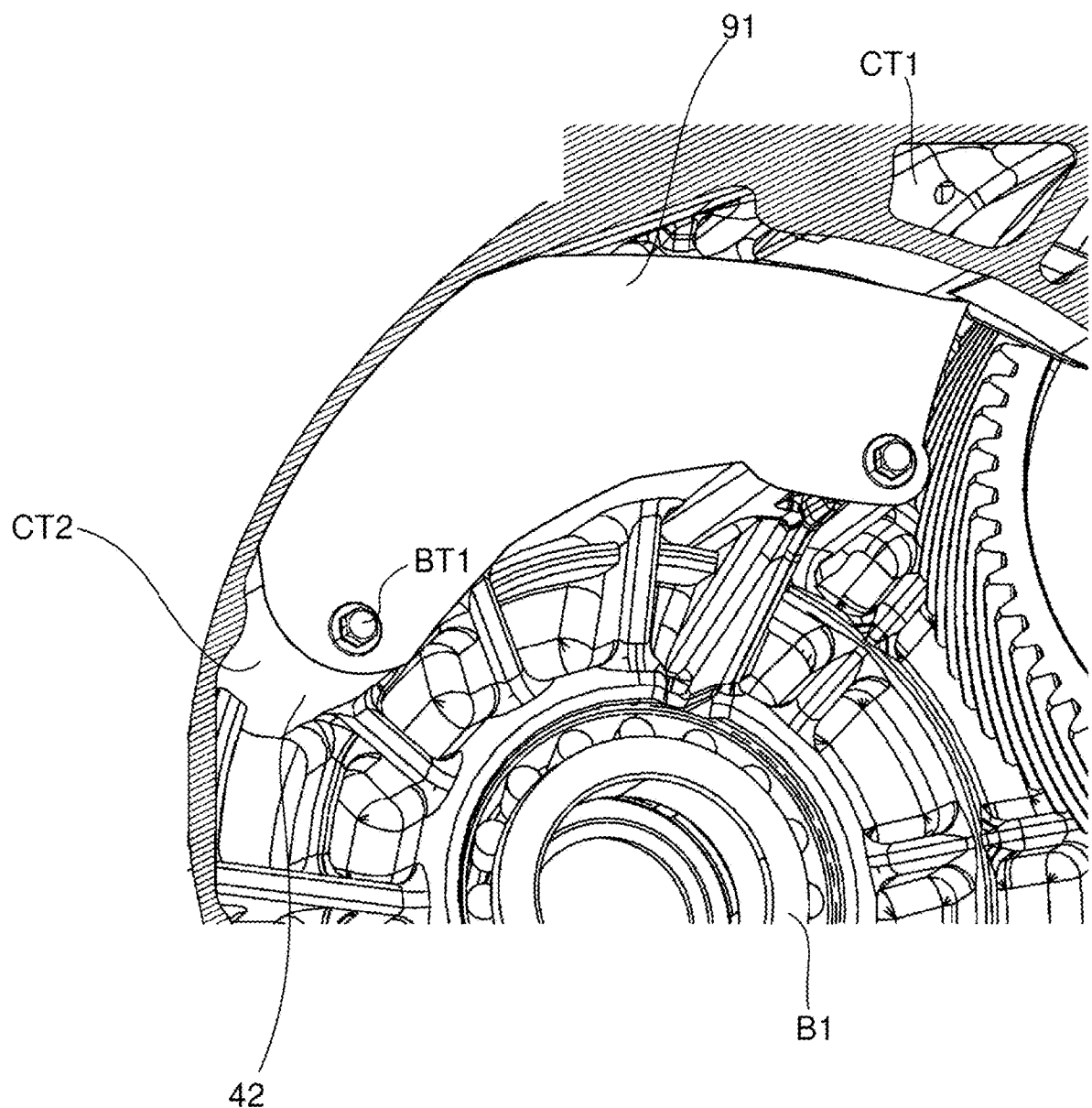
FIG. 9 is a perspective view, partially in cross section, illustrating a second catch tank according to an example embodiment of the present disclosure.

The drive shaft Ds on the first side in the axial direction is mounted to the side gear of the differential 31 on the first side in the axial direction. This drive shaft Ds is rotatably supported by the first bearing B1 (FIG. 9 to be described later). The first bearing B1 is held by the gear housing 4B. The first gear 311 is supported by the first bearing B1 via the gear housing 312, the pinion gear, and the side gear. That is, the power transmission 3 includes the first bearing B1 that supports the first gear 311.

The drive shaft Ds (FIG. 1) on the second side in the axial direction is mounted to the side gear of the differential 31 on the second side in the axial direction. This drive shaft Ds is rotatably supported by the fourth bearing (not shown). The fourth bearing is held by the motor housing 4A.

The reduction gear 35 is fixed to the motor shaft 211 (FIG. 2). The reduction gear 35 has a function of reducing the rotation speed of the motor 2 and increasing torque output from the motor 2 according a reduction ratio. The reduction gear 35 transmits the torque output from the motor 2 to the differential 31. The reduction gear 35 includes a gear member 32, a gear member 33, and a gear member 34 (FIG. 4).

The gear member 32 is a member extending in the axial direction, and includes the second gear 321, a shaft portion 322, and a shaft portion 323 (FIG. 3). That is, the power transmission 3 includes the second gear 321. The second gear 321, the shaft portion 322, and the shaft portion 323 constitute the same member. A hollow portion 32A extending in the axial direction is provided inside the gear member 32. The gear member 32 (second gear 321) rotates about the second rotation axis J2. The second gear 321 is disposed between the first gear 311 and the third gear 341 in the front-rear direction and is disposed above the first gear 311 (FIG. 4).

The shaft portion 323 is disposed on the first side of the second gear 321 in the axial direction (FIG. 3). An end of the shaft portion 323 on the first side in the axial direction is rotatably supported by the second bearing B2. The second bearing B2 is held by the gear housing 4B. That is, the power transmission 3 includes the second bearing B2 that supports the second gear 321.

The shaft portion 322 is disposed on the second side of the second gear 321 in the axial direction (FIG. 3). The shaft portion 322 is rotatably supported by the fifth bearing B5. The fifth bearing B5 is held by the motor housing 4A.

The second gear 321 meshes with the first gear 311 (FIG. 4). An outer diameter of the first gear 311 is larger than an outer diameter of the second gear 321.

The gear member 33 is fixed to the outer periphery of the shaft portion 323 (FIG. 3). That is, the gear member 33 is disposed on the first side in the axial direction with respect to the second gear 321. As a result, the gear member 33 rotates about the second rotation axis J2 together with the gear member 32. The outer diameter of the second gear 321 is smaller than the outer diameter of the gear member 33.

The gear member 34 is a member extending in the axial direction, and includes the third gear 341, a shaft portion 342, and a shaft portion 343 (FIG. 2). That is, the power transmission 3 includes the third gear 341. The third gear 341, the shaft portion 342, and the shaft portion 343 constitute the same member. A hollow portion 34A extending in the axial direction is provided inside the gear member 34. The gear member 34 (third gear 341) rotates about a third rotation axis J3. The third gear 341 is disposed in front of the first gear 311 (FIG. 4).

The shaft portion 343 is disposed on the first side of the third gear 341 in the axial direction (FIG. 2). The shaft portion 343 is rotatably supported by the third bearing B3. The third bearing B3 is held by the gear housing 4B. That is, the power transmission 3 includes the third bearing B3 that supports the third gear 341.

The shaft portion 342 is disposed on the second side of the third gear 341 in the axial direction (FIG. 2). The shaft portion 342 is rotatably supported by the sixth bearing B6. The sixth bearing B6 is held by the motor housing 4A.

An end of the shaft portion 342 on the second side in the axial direction is connected to the end of the motor shaft 211 on the first side in the axial direction by a screw engagement. That is, the third gear 341 is connected to the motor 2. As a result, the third gear 341 rotates when the motor shaft 211 of the motor 2 rotates. Since the third gear 341 meshes with the gear member 33, the third gear 341 transmits the rotational driving force of the motor 2 to the second gear 321. Then, the rotational driving force is transmitted from the second gear 321 to the first gear 311 of the differential 31. The outer diameter of the gear member 33 is larger than the outer diameter of the third gear 341.

In addition, the hollow portion 34A and the hollow portion 211A communicate with each other due to the connection between the gear member 34 and the motor shaft 211.

The oil pump 5 (FIG. 1) supplies oil stored in the housing 4 to the motor 2. As illustrated in FIG. 4, the lower part of the second housing space S2 inside the housing 4 is partitioned into a first oil storage portion 81 and a second oil storage portion 82 by a wall 4D. The lower part of the first gear 311 is immersed in the oil stored in the first oil storage portion 81. The oil pump 5 sucks oil stored in the first oil storage portion 81. The oil pump 5 is an electric pump driven by electric power.

The oil sucked by the oil pump 5 flows into the oil cooler 6 (FIG. 1) disposed in the middle of a path of an oil pipe. A refrigerant pipe extending from a radiator is connected to the oil cooler 6. Cooling water is introduced into the oil cooler 6 through the refrigerant pipe, and oil is cooled by heat exchange between the cooling water and the oil. The cooled oil is supplied to the motor 2.

The inverter unit 7 (FIG. 1) is electrically connected to the motor 2. The inverter unit 7 controls a current supplied to the motor 2. The inverter unit 7 is fixed to an upper part of the housing 4.

The drive device 1 includes a catch tank that stores the oil stored in the housing 4. Specifically, the drive device 1 includes a first catch tank CT1, a second catch tank CT2, a third catch tank CT3, and a fourth catch tank CT4.

Figure 5:
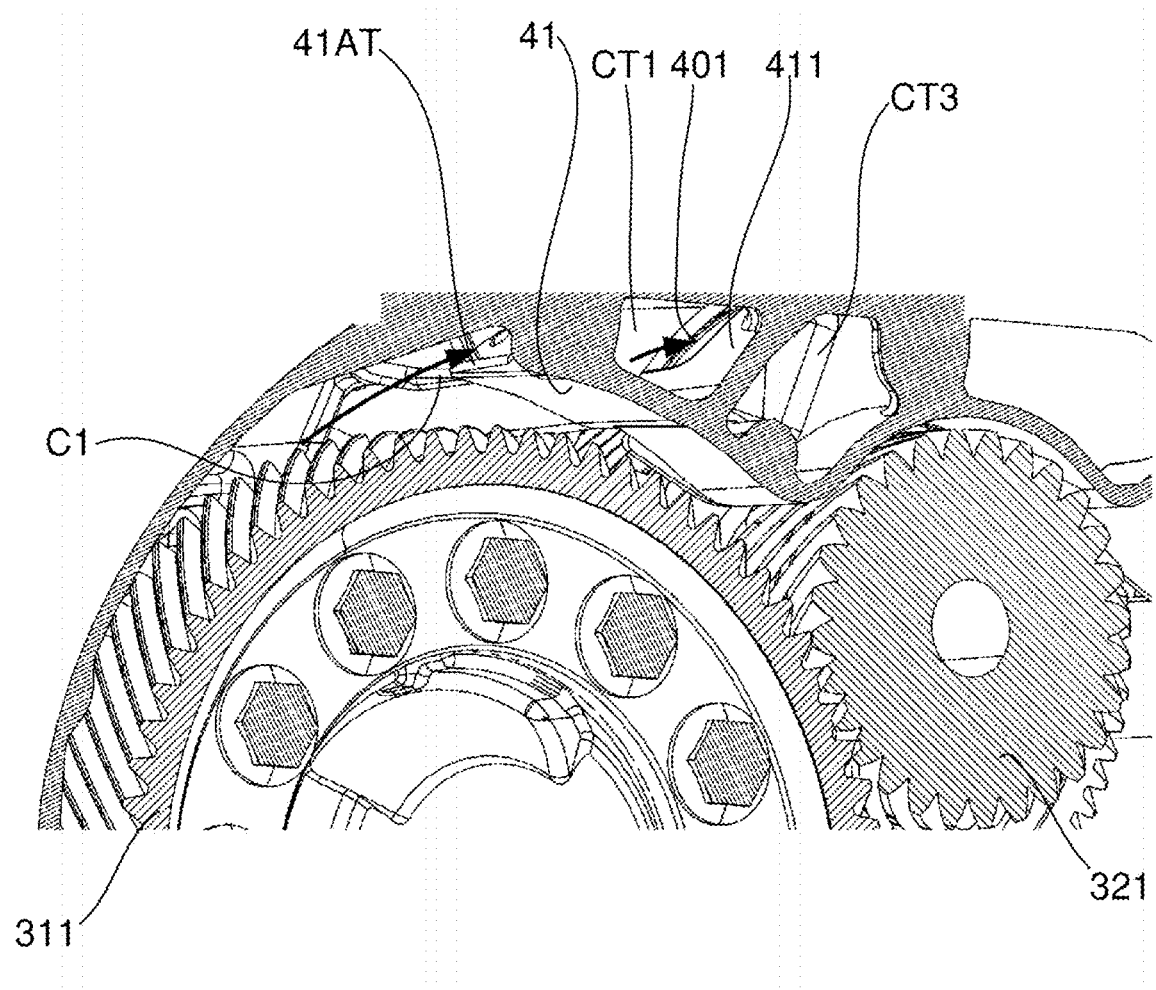
FIG. 5 is a perspective view, partially in cross section, illustrating first and third catch tanks according to an example embodiment of the present disclosure.
Figure 6:
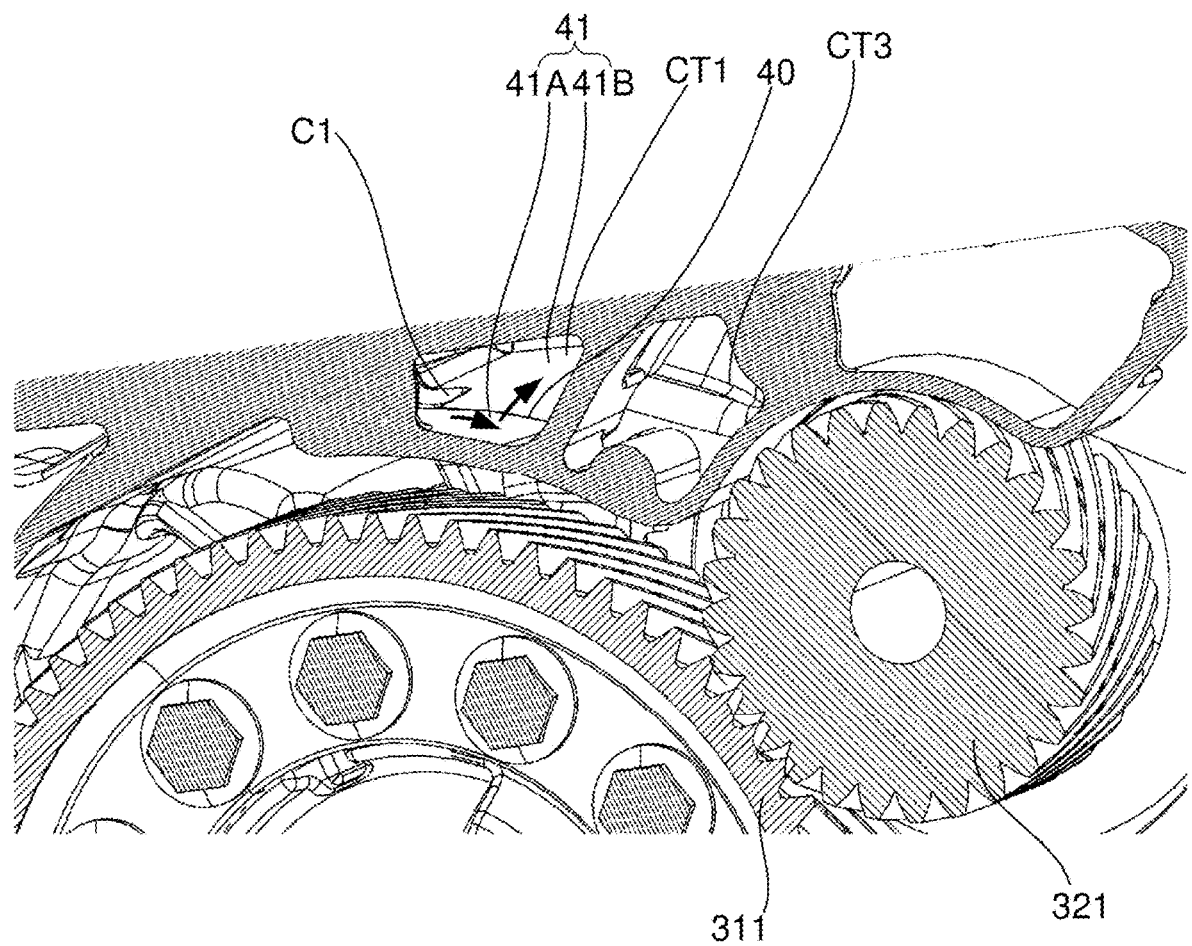
FIG. 6 is a perspective view, partially in cross section, illustrating the first and third catch tanks.

FIGS. 5 and 6 are perspective views, partially in cross section, of the drive device 1 illustrating the configuration of the first catch tank CT1. The first catch tank CT1 is disposed above the first gear 311. The first catch tank CT1 has a first bent portion 41. The first bent portion 41 extends in the axial direction from an end of the gear housing 4B on the first side in the axial direction to the housing wall portion 4C (FIG. 2) of the motor housing 4A.

The first bent portion 41 is bent toward between the first gear 311 and the second gear 321. The first bent portion 41 has a first inclined portion 411 inclined forward and upward (FIG. 5). The wording "bent toward between the gear and the gear" means that, in a space between the gears above a region where the gears mesh with each other, a line passing through the center of an angle protruding and bent toward the space is located. The same applies in the following description.

As illustrated in FIG. 6, the first bent portion 41 includes an axially second-side portion 41A which is a portion of the motor housing 4A and an axially first-side portion 41B which is a portion of the gear housing 4B. A portion of the axially second-side portion 41A on the first side in the axial direction overlaps a portion of the axially first-side portion 41B on the second side in the axial direction above the part on the second side in the axial direction as viewed from the above. Thus, an end surface of the axially second-side portion 41A on the first side in the axial direction is formed as a step 40.

That is, the first bent portion 41 has the step 40. An area of the first bent portion 41 on the first side in the axial direction with respect to the step 40 is located below an area of the first bent portion 41 on the second side in the axial direction with respect to the step 40.

Figure 7:
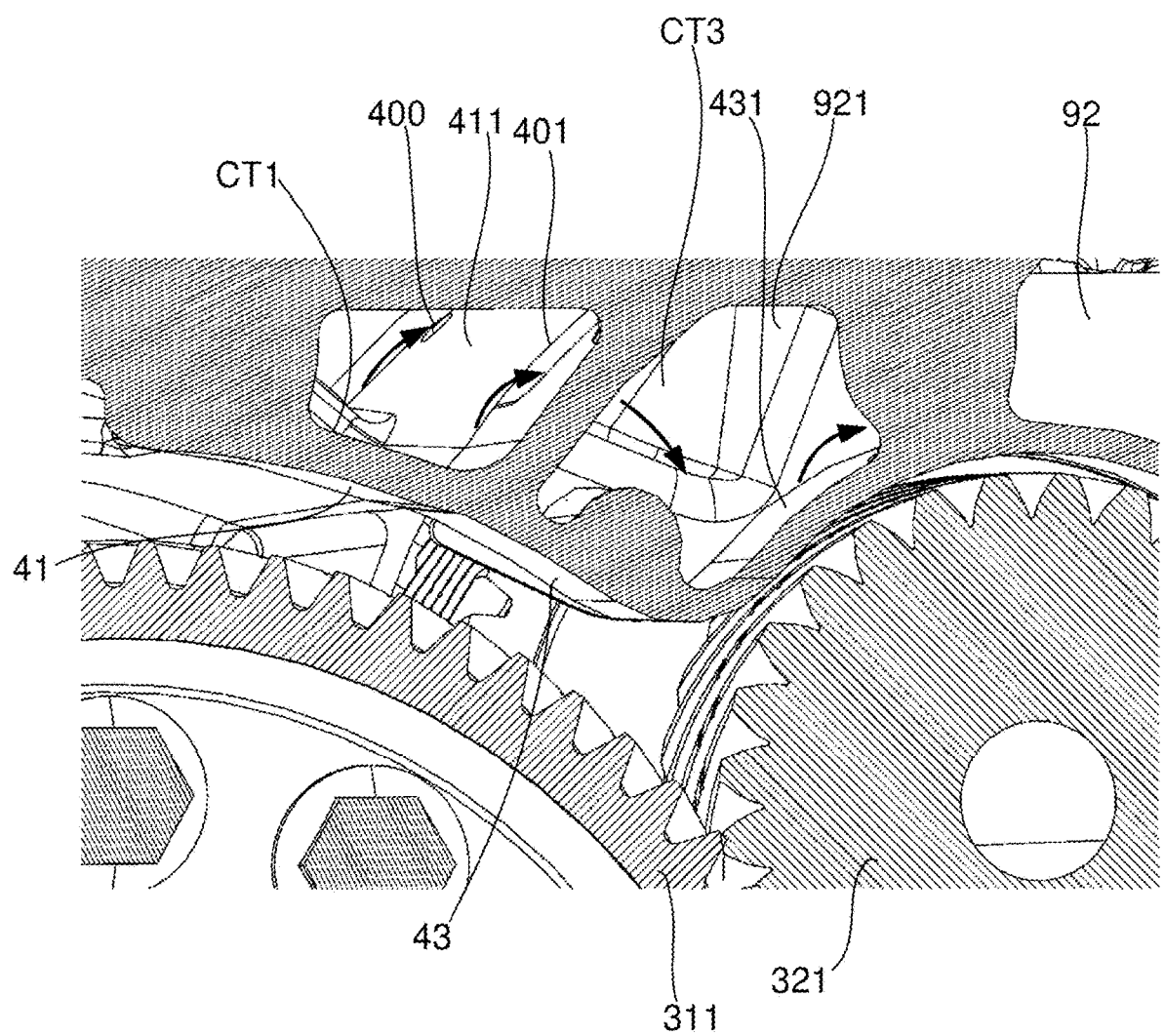
FIG. 7 is a perspective view, partially in cross section, illustrating the first and third catch tanks.
Figure 8:
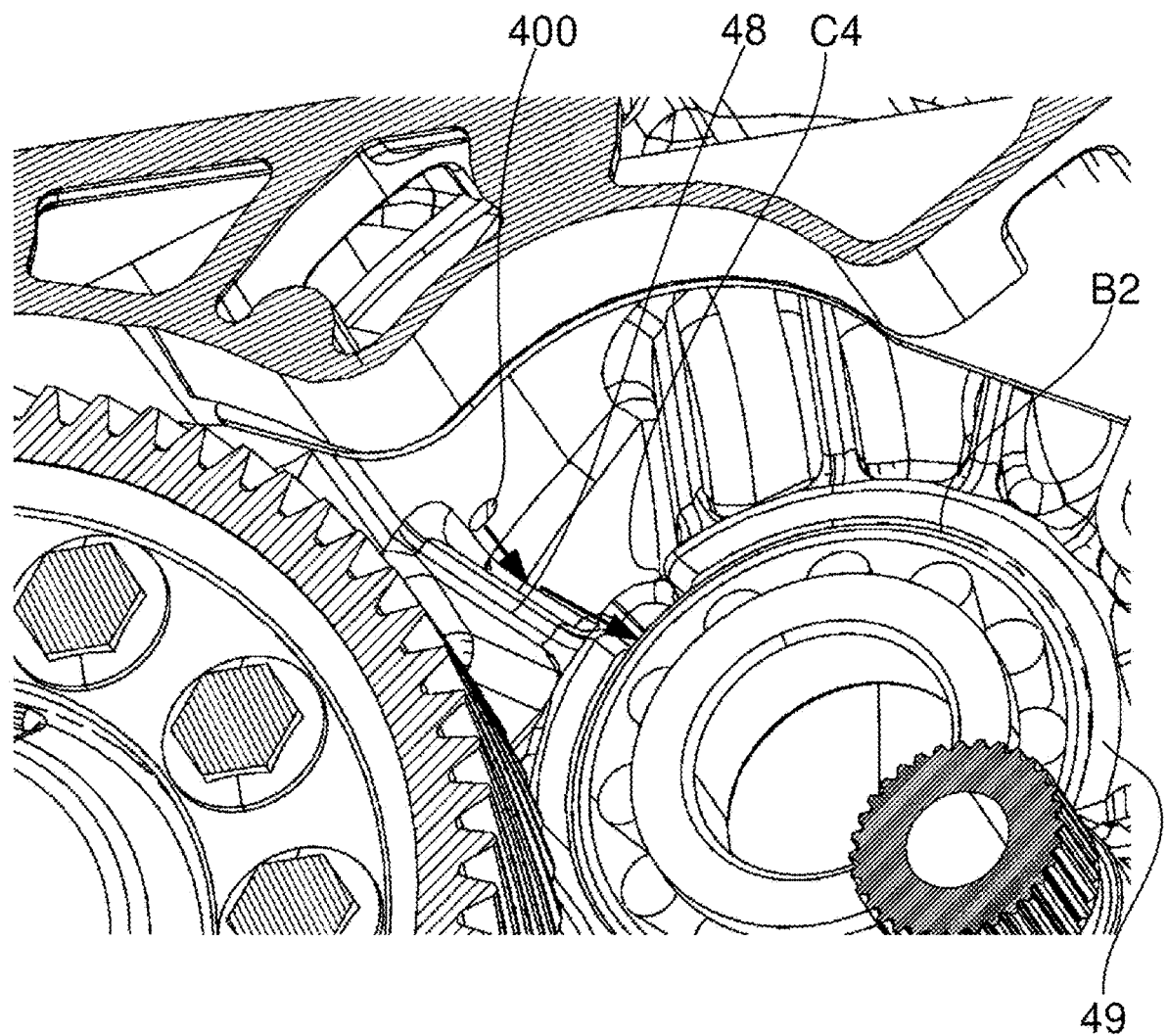
FIG. 8 is a perspective view, partially in cross section, illustrating a configuration for supplying oil to a second bearing according to an example embodiment of the present disclosure.

In addition, the first inclined portion 411 is provided with a through hole 400 penetrating in the front-rear direction as illustrated in FIG. 7. As illustrated in FIG. 8, a second rib 48 is disposed below the front end of the through hole 400. The second rib 48 protrudes from the end of the gear housing 4B on the first side in the axial direction to the second side in the axial direction. A notch C4 is provided below the second rib 48. The notch C4 is provided in a bearing housing portion 49 of the gear housing 4B. The bearing housing portion 49 houses the second bearing B2. With this configuration, the first catch tank CT1 communicates with the second bearing B2 via the through hole 400, the second rib 48, and the notch C4.

As illustrated in FIG. 9, the second catch tank CT2 is disposed below the first catch tank CT1. In FIG. 9, the differential 31 is not illustrated for convenience. The second catch tank CT2 is disposed on the first side of the first gear 311 in the axial direction.

Figure 10:
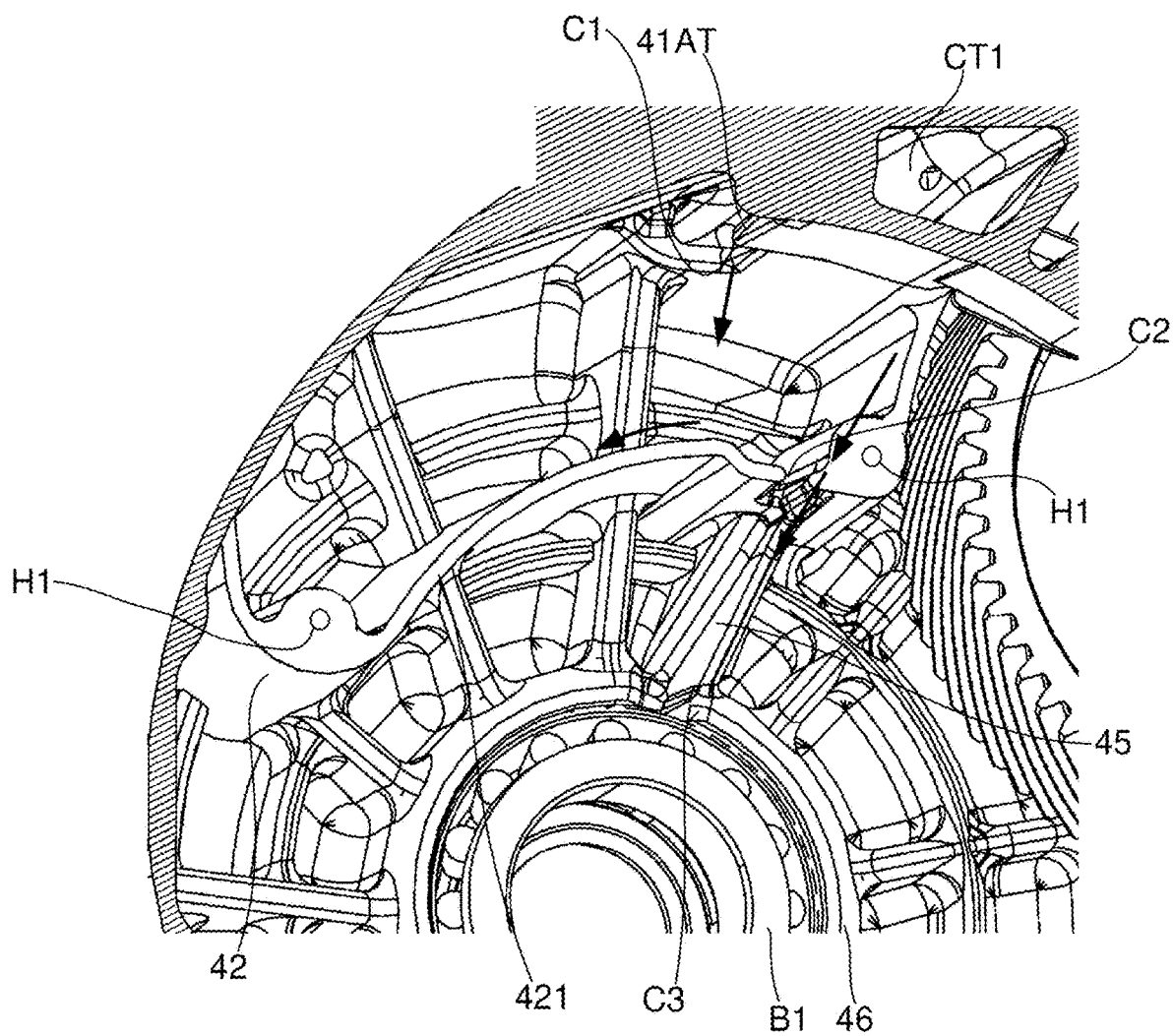
FIG. 10 is a diagram illustrating a state in which a first plate-shaped portion in FIG. 9 is removed.

As illustrated in FIG. 9, the second catch tank CT2 includes a second bent portion 42 and a first plate-shaped portion 91. Here, FIG. 10 illustrates a state in which the first plate-shaped portion 91 in FIG. 9 is removed. As illustrated in FIG. 10, the second bent portion 42 is bent downward. The second bent portion 42 has an inclined portion 421 inclined forward and upward.

As illustrated in FIG. 5, in the first catch tank CT1 described above, a notch C1 is provided adjacent to a rear end 41AT of the axially second-side portion 41A of the first bent portion 41 on the first side in the axial direction. As illustrated in FIG. 10, a space above the second catch tank CT2 communicates with a space above the first catch tank CT1 via the notch C1.

As illustrated in FIG. 6, the notch C1 is disposed on the first side in the axial direction with respect to the step 40. Therefore, the space above the first catch tank CT1 communicates with the space above the second catch tank CT2 on the first side in the axial direction with respect to the step 40.

As illustrated in FIG. 9, the first plate-shaped portion 91 extends in a plane perpendicular to the axial direction. The first plate-shaped portion 91 is disposed on the second side of the second bent portion 42 in the axial direction. As illustrated in FIG. 10, a screw hole H1 is provided in a protruding piece protruding from the end of the gear housing 4B on the first side in the axial direction toward the second side in the axial direction. The second bent portion 42 is a portion of the protruding piece. That is, the second bent portion 42 is provided on the gear housing 4B. One of the screw holes H1 is provided in the second bent portion 42. As illustrated in FIG. 9, a bolt BT1 is screwed to the screw hole H1 while a space surrounded by the protruding piece is covered with the first plate-shaped portion 91, whereby the first plate-shaped portion 91 is fixed to the protruding piece. As described above, in the assembly of the drive device 1, the first plate-shaped portion 91 can be fixed to the gear housing 4B before the gear housing 4B is attached to the motor housing 4A, and thus, it is easy to mount the first plate-shaped portion 91 to the inside of the housing 4.

As illustrated in FIG. 10, a notch C2 is provided in front of the second bent portion 42. A first rib 45 is provided below the notch C2. The gear housing 4B has the first rib 45. The first rib 45 protrudes from the end of the gear housing 4B on the first side in the axial direction to the second side in the axial direction. That is, the housing 4 has the first rib 45 that protrudes from the end of the housing 4 on the first side in the axial direction to the second side in the axial direction. A notch C3 is provided below the first rib 45. The notch C3 is provided in a bearing housing portion 46 of the gear housing 4B. The bearing housing portion 46 houses the first bearing B1. As a result, the second catch tank CT2 communicates with the first bearing B1 via the notch C2, the first rib 45, and the notch C3.

As illustrated in FIGS. 5 and 6, the third catch tank CT3 is disposed in front of the first catch tank CT1.

As illustrated in FIG. 7, the third catch tank CT3 is disposed above the second gear 321. The third catch tank CT3 has a third bent portion 43. The third bent portion 43 is provided on the housing wall portion 4C of the motor housing 4A and extends in the axial direction. The third bent portion 43 is provided in the motor housing 4A. The third bent portion 43 is bent toward between the first gear 311 and the second gear 321. The third bent portion 43 has a second inclined portion 431 inclined forward and upward. A space above the third bent portion 43 communicates with a space above the first bent portion 41 via an opening 401.

Figure 11:
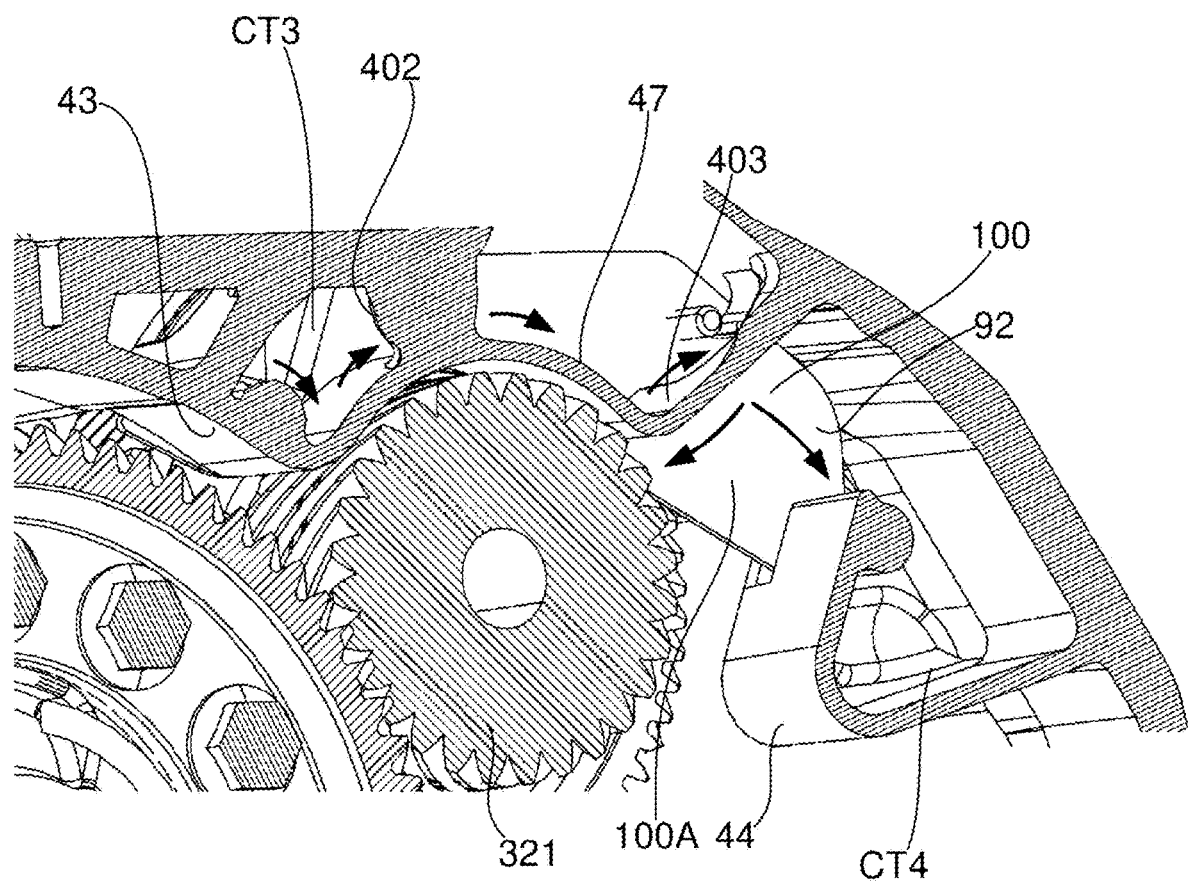
FIG. 11 is a perspective view, partially in cross section, illustrating a path of oil from the third catch tank to a fourth catch tank according to an example embodiment of the present disclosure.

As illustrated in FIG. 11, the third catch tank CT3 includes a second plate-shaped portion 92. The second plate-shaped portion 92 extends in a plane perpendicular to the axial direction. The second plate-shaped portion 92 is disposed on the first side of the third bent portion 43 in the axial direction. More specifically, the front end of the second plate-shaped portion 92 covers the space above the third bent portion 43 from the first side in the axial direction.

As illustrated in FIG. 11, a bent portion 47 is disposed in front of the third bent portion 43. The bent portion 47 is disposed above the second gear 321. The bent portion 47 is provided in the motor housing 4A. An opening 402 is provided between the third bent portion 43 and the bent portion 47. The front part of the bent portion 47 is curved along the outer periphery of the second gear 321. The bent portion 47 is bent downward. An opening 403 is provided in a rear part of the bent portion 47.

As illustrated in FIG. 11, the second plate-shaped portion 92 extends from the first side of the third bent portion 43 in the axial direction to a fourth bent portion 44 described later via the first side of the opening 402 in the axial direction and the first side of the bent portion 47 in the axial direction.

Figure 12:
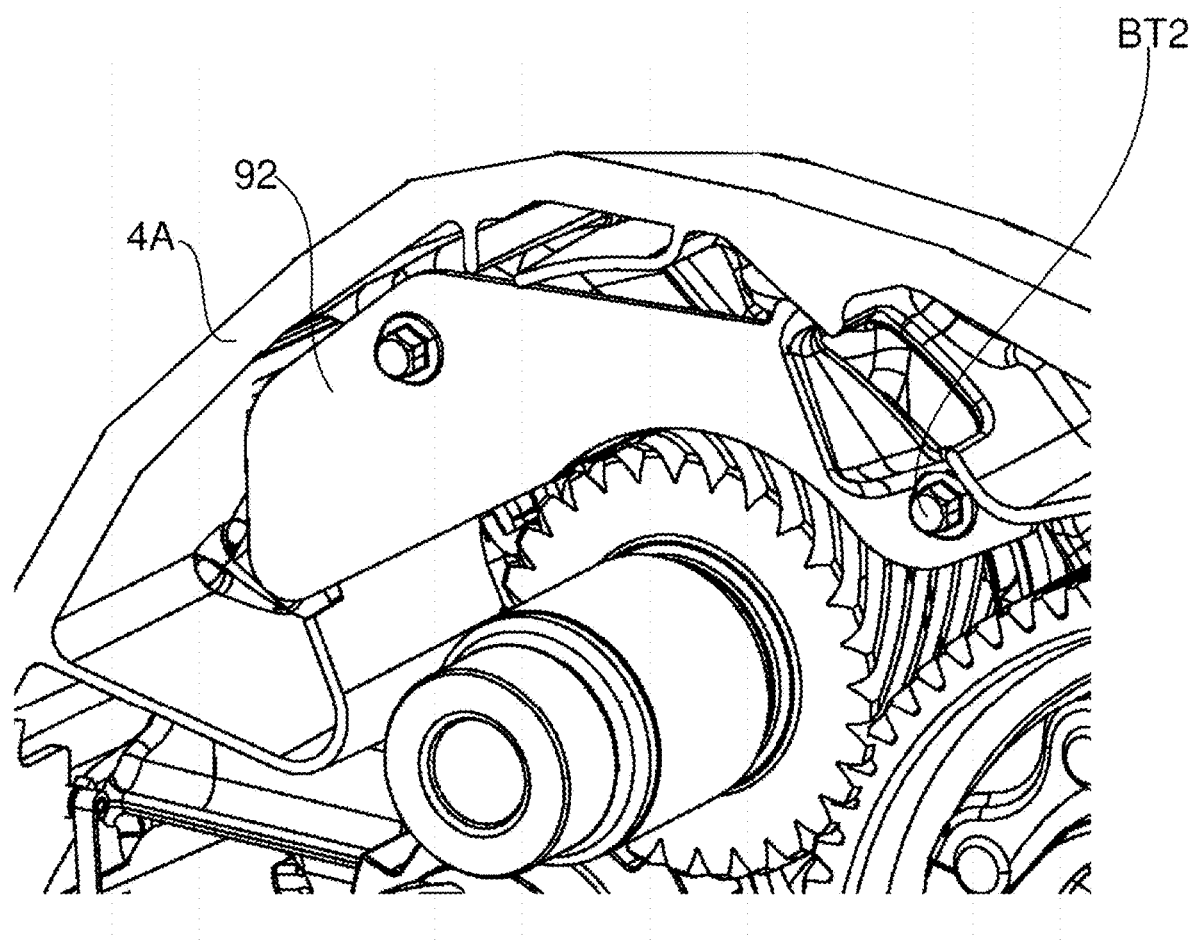
FIG. 12 is a partial perspective view illustrating a state according to an example embodiment of the present disclosure in which a gear housing is removed.

Here, FIG. 12 is a partial perspective view as viewed from the first side in the axial direction with the gear housing 4B being removed. As illustrated in FIG. 12, the second plate-shaped portion 92 is fixed to the third bent portion 43 by a bolt BT2. As described above, in the assembly of the drive device 1, the second plate-shaped portion 92 can be fixed to the motor housing 4A before the gear housing 4B is attached to the motor housing 4A, and thus, it is easy to mount the second plate-shaped portion 92 to the inside of the housing 4.

As illustrated in FIG. 7, the second plate-shaped portion 92 has a recess 921 recessed toward the first side in the axial direction. More specifically, the front end of the second plate-shaped portion 92 has the recess 921. The position of the recess 921 overlaps the position of the third bent portion 43 in the front-rear direction position as viewed in the axial direction. The third catch tank CT3 has the recess 921.

Figure 13:
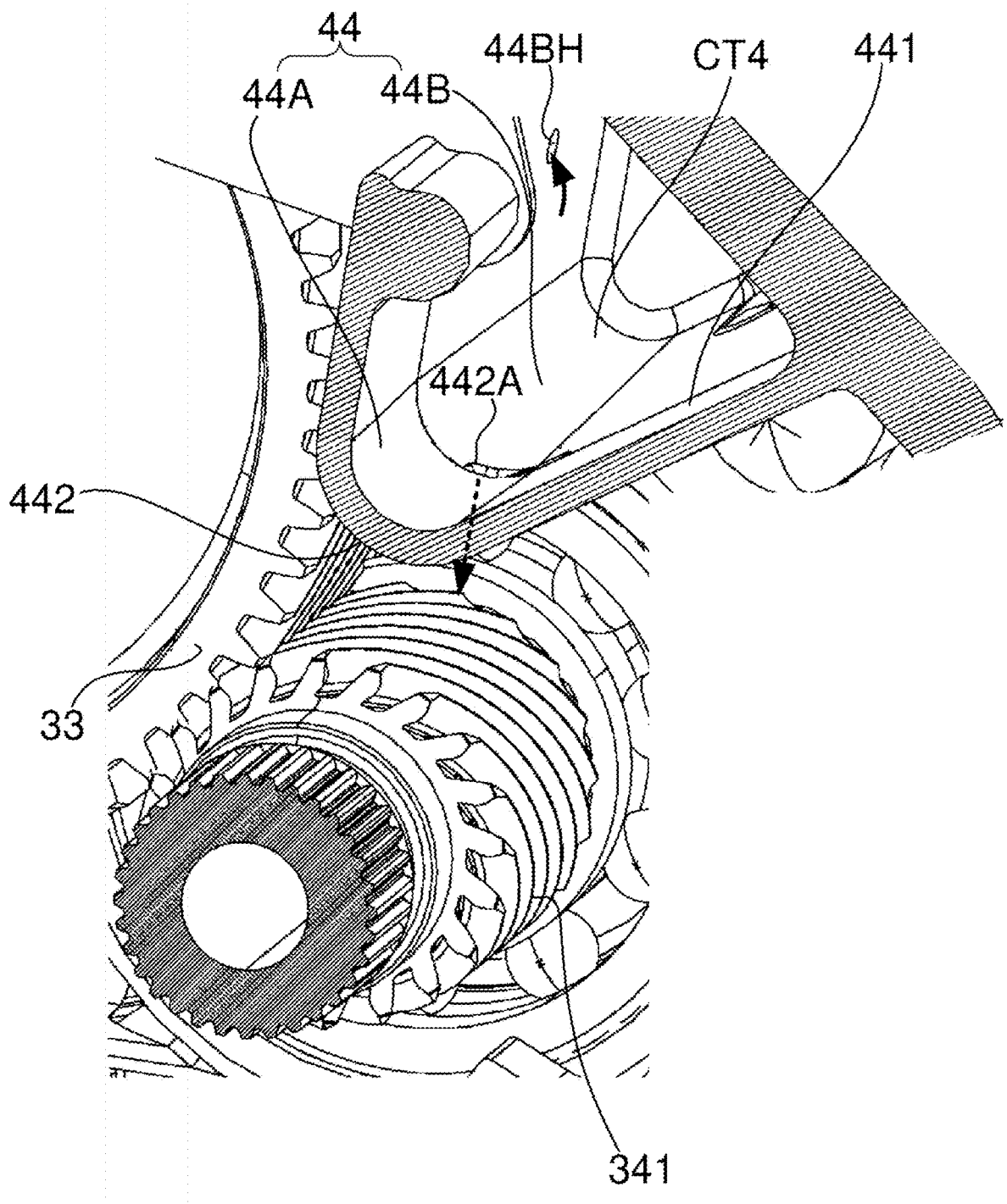
FIG. 13 is a perspective view, partially in cross section, illustrating the fourth catch tank.

The fourth catch tank CT4 is disposed in front of the second gear 321 and above the third gear 341 (FIG. 4). As illustrated in FIGS. 11 and 13, the fourth catch tank CT4 has the fourth bent portion 44. The fourth bent portion 44 extends in the axial direction from the end of the gear housing 4B on the first side in the axial direction to the housing wall portion 4C (FIG. 2) of the motor housing 4A. The fourth bent portion 44 includes an axially second-side portion 44A which is a portion of the motor housing 4A and an axially first-side portion 44B which is a portion of the gear housing 4B.

The fourth bent portion 44 is bent downward. More specifically, the fourth bent portion 44 is bent toward a portion where the gear member 33 and the third gear 341 are in contact with each other. The fourth bent portion 44 has a third inclined portion 441 inclined forward and upward. A top portion 442 of the fourth bent portion 44 is provided with a through hole 442A penetrating the fourth bent portion 44 in the downward direction. A space above the fourth bent portion 44 communicates with the space above the third bent portion 43 via a communication path 100 (FIG. 11) to be described later.

Figure 14:
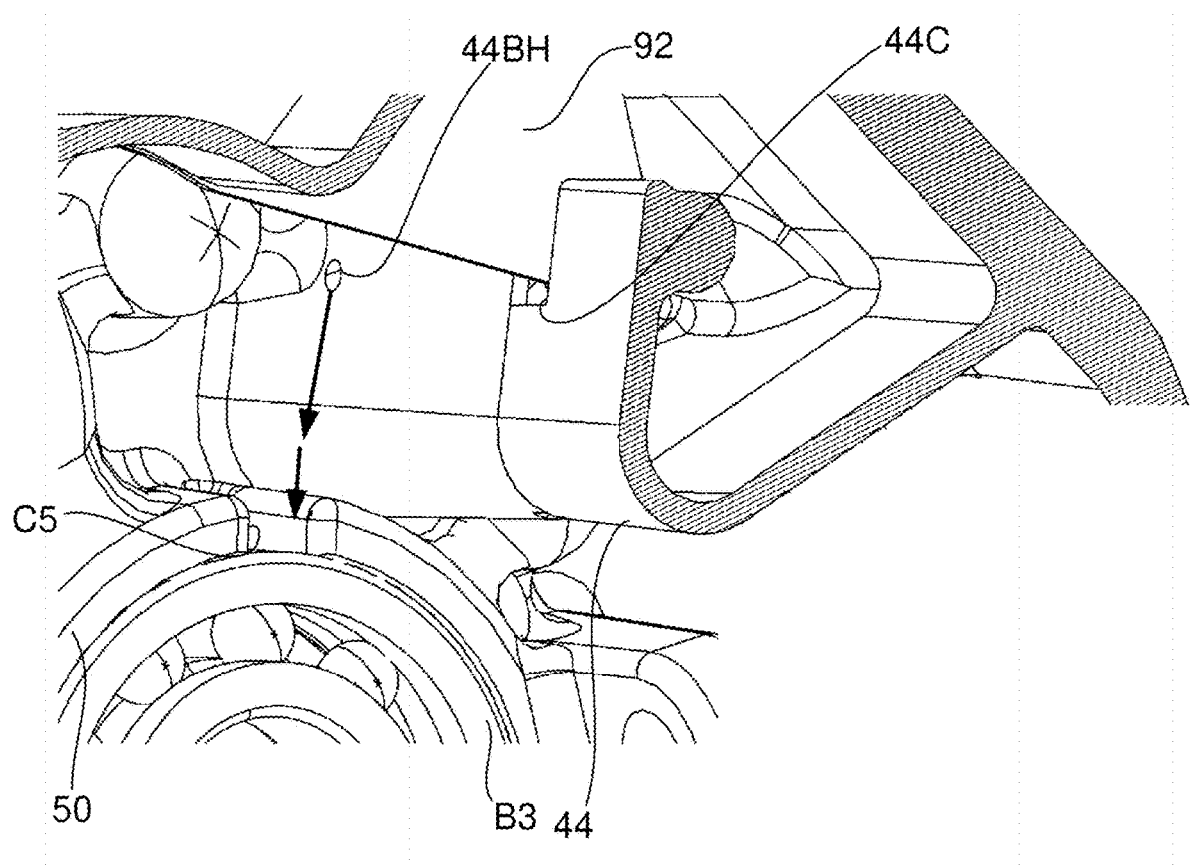
FIG. 14 is a perspective view, partially in cross section, illustrating a configuration for supplying oil to a third bearing according to an example embodiment of the present disclosure.

As illustrated in FIG. 13, a through hole 44BH penetrating in the front-rear direction is provided in the front part of the fourth bent portion 44. As illustrated in FIG. 14, a notch C5 is disposed behind and below the through hole 44BH. The notch C5 is provided in a bearing housing portion 50 of the gear housing 4B. The bearing housing portion 50 houses the third bearing B3. As a result, the fourth catch tank CT4 communicates with the third bearing B3 via the through hole 44BH and the notch C5.

Note that, as illustrated in FIG. 14, a notch 44C is provided at the upper end of the front part of the fourth bent portion 44. The lower end of the front end of the second plate-shaped portion 92 is disposed inside the notch 44C.

Next, a path through which oil flows in the drive device having the above configuration will be described. In the drawings, the flow of oil is indicated by an arrow.

The oil storage portion 81 in which oil is stored is provided in the lower part of the housing 4, and a lower part of the first gear 311 is housed in the oil storage portion 81 (FIG. 4). When the first gear 311 rotates clockwise as viewed from the first side in the axial direction upon activation of the drive device 1, the oil stored in the lower part of the oil storage portion 81 (FIG. 4) is scraped up by the first gear 311.

The space above the first bent portion 41 communicates with the oil storage portion 81. As illustrated in FIG. 5, the oil scraped up as described above enters the inside of the first catch tank CT1 from above the rear end 41AT. The entering oil hits the first inclined portion 411 and stays in the axially second-side portion 41A (FIG. 6) of the first bent portion 41. In addition, as illustrated in FIG. 6, a portion of the oil entering the first catch tank CT1 flows into the axially first-side portion 41B beyond the step 40. In this manner, the oil is stored inside the first catch tank CT1.

A portion of the oil flowing into the axially first-side portion 41B is dropped into the second catch tank CT2 through the notch C1 (FIG. 10). The oil flowing into the first side in the axial direction with respect to the step 40 in the first catch tank CT1 is prevented from being returned to the second side in the axial direction by the step 40, whereby it can be efficiently guided to the second catch tank CT2.

The oil dropped to the second catch tank CT2 flows downward through the inclined portion 421 of the second bent portion 42 and is stored in the second bent portion 42 (FIG. 10). In this manner, the oil is stored inside the second catch tank CT2. Since the first plate-shaped portion 91 is disposed on the second side of the second bent portion 42 in the axial direction, it is possible to suppress the oil stored in the second bent portion 42 from leaking to the second side in the axial direction.

A portion of the oil dropped inside the second catch tank CT2 is supplied to the first bearing B1 via the notch C2, the first rib 45, and the notch C3 (FIG. 10). This enables lubrication of the first bearing B1. In addition, since the oil is supplied to the first bearing B1 via the first rib 45, the oil can be sufficiently supplied to the first bearing B1 even if there is a certain distance from the second catch tank CT2 to the first bearing B1.

As illustrated in FIG. 7, a portion of the oil stored in the first catch tank CT1 flows into the through hole 400. The flowing oil is supplied to the second bearing B2 via the second rib 48 and the notch C4 as illustrated in FIG. 8. This enables lubrication of the second bearing B2. A portion of the oil supplied to the second bearing B2 can be supplied to the fifth bearing B5 through the hollow portion 32A (FIG. 3) of the gear member 32. This enables lubrication of the fifth bearing B5.

As illustrated in FIGS. 5 and 7, a portion of the oil stored in the first catch tank CT1 flows into the third catch tank CT3 through the opening 401 provided in the first inclined portion 411. Since the first catch tank CT1 communicates with the third catch tank CT3 via the first inclined portion 411 as described above, the oil can be easily guided to the third catch tank CT3 as compared with a case where the first inclined portion 411 is a wall extending in the vertical direction. Therefore, it is possible to suppress hindrance of the circulation of the oil.

As illustrated in FIG. 7, a portion of the oil flowing into the third catch tank CT3 is stored in the third bent portion 43. At this time, a portion of the oil flowing into the third catch tank CT3 is stored in the recess 921 provided in the second plate-shaped portion 92. As a result, the amount of oil stored in the third catch tank CT3 can be ensured. Since the second plate-shaped portion 92 is disposed on the first side of the third bent portion 43 in the axial direction, it is possible to suppress the oil inside the third catch tank CT3 from leaking to the first side in the axial direction.

As illustrated in FIG. 11, a portion of the oil stored in the third bent portion 43 flows into the bent portion 47 through the opening 402. The flowing oil flows above the bent portion 47 and flows forward through the opening 403. A portion of the oil flowing out of the opening 403 flows into the fourth catch tank CT4 along the second plate-shaped portion 92. As described above, the communication path 100 (FIG. 11) for connecting the third catch tank CT3 and the fourth catch tank CT4 is constituted by the opening 402, the space above the bent portion 47, the opening 403, and a space along the second plate-shaped portion 92 between the opening 403 and the fourth catch tank CT4.

Since the oil stored in the third bent portion 43 is guided to the fourth catch tank CT4 via the second inclined portion 431 (FIG. 7), it is easy to guide the oil to the fourth catch tank CT4 side as compared with a case where the second inclined portion 431 is a wall extending in the vertical direction. Therefore, it is possible to suppress hindrance of the circulation of the oil.

In addition, the communication path 100 is provided with an opening 100A that opens toward the second gear 321. As a result, as illustrated in FIG. 11, a portion of the oil flowing forward through the opening 403 can be guided to the second gear 321 along the second plate-shaped portion 92 via the opening 100A. Therefore, the second gear 321 can be lubricated.

The oil flowing into the fourth catch tank CT4 is stored in the fourth bent portion 44. Here, due to the third inclined portion 441 and the through hole 442A provided in the top portion 442, the oil stored in the fourth bent portion 44 is easily dropped to the third gear 341 through the through hole 442A (FIG. 13). Therefore, the third gear 341 can be lubricated.

A portion of the oil stored in the fourth bent portion 44 is supplied to the third bearing B3 through the through hole 44BH and the notch C5 (FIG. 14). As a result, the third bearing B3 can be lubricated.

As described above, according to the drive device 1 of the present example embodiment, a portion of the oil stored in the housing 4 can be stored in each of the first catch tank CT1, the second catch tank CT2, the third catch tank CT3, and the fourth catch tank CT4 during driving. Therefore, the amount of oil in which the lower part of the first gear 311 is immersed can be reduced, and a stirring loss generated when the oil is stirred by the first gear 311 can be reduced. Further, the catch tank of each portion can be disposed at a position suitable for supplying oil to a sliding member, which is a bearing or a gear, for the purpose of lubricating the sliding member. Specifically, the first catch tank CT1 and the second catch tank CT2 are suitable for supplying oil to the first bearing B1, the first catch tank CT1 is suitable for supplying oil to the second bearing B2, and the fourth catch tank CT4 is suitable for supplying oil to the third gear 341 and the third bearing B3. Therefore, it is possible to appropriately lubricate the sliding members of the respective portions while reducing the stirring loss.

Figure 15:
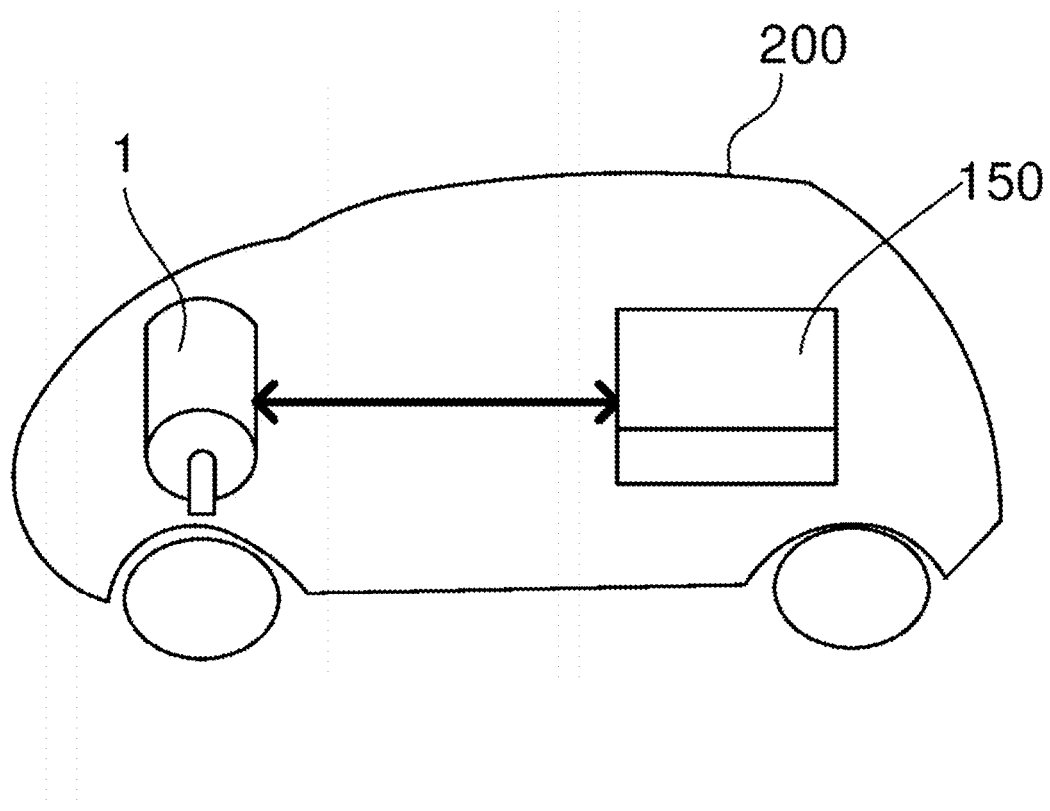
FIG. 15 is a schematic view illustrating an example of a vehicle equipped with the drive device according to an example embodiment of the present disclosure.

FIG. 15 is a schematic diagram illustrating an example of a vehicle 200 including the drive device 1. In FIG. 15, the drive device 1 is conceptually illustrated. The vehicle 200 includes the drive device 1 and a battery 150. The battery 150 stores electric power to be supplied to the drive device 1. In an example of the vehicle 200, the drive device 1 drives left and right front wheels. Note that the drive device 1 may drive at least one of the wheels.

In the vehicle 200 including the drive device 1, it is possible to achieve extension of a cruising distance by reduction of a stirring loss and the like, and it is possible to suppress a traveling trouble caused by a lubrication state by oil.

As illustrated in FIG. 4, the housing 4 has the wall 4D. The wall 4D extends forward and upward from the lower part of the housing 4 along the outer periphery of the first gear 311. The wall 4D partitions a lower part of the housing 4 into the first oil storage portion 81 on the rear and the second oil storage portion 82 on the front. As a result, it is possible to separate the oil stored in the first oil storage portion 81 and mixed with the air by the stirring by the first gear 311 and the oil stored in the second oil storage portion 82, whereby an amount of oil mixed with the air can be reduced. The first oil storage portion 81 and the second oil storage portion 82 communicate with each other through an opening 404 (FIG. 4) provided in the wall 4D.

The example embodiment of the present disclosure has been described above. Note that the scope of the present disclosure is not limited to the above example embodiment. The present disclosure can be implemented by making various modifications to the abovementioned example embodiment without departing from the gist of the disclosure.

The present disclosure can be used, for example, for driving various kinds of vehicles.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
a motor including a rotor rotatable about a motor axis extending along a first direction;
a power transmission including a first gear, a second gear that meshes with the first gear, and a third gear that is connected to the motor to transmit a rotational driving force of the motor to the second gear; and
a housing that houses the motor and the power transmission; wherein
a direction perpendicular to the first direction is defined as a second direction;
a direction perpendicular to the first direction and the second direction is defined as a third direction;
the first gear and the third gear are side by side in the second direction;
the third gear is on a first side of the first gear in the second direction;
the second gear is between the first gear and the third gear in the second direction, and on a first side of the first gear in the third direction;
the housing includes:
a first catch tank on the first side of the first gear in the third direction;
a second catch tank on a second side of the first catch tank in the third direction;
a third catch tank on the first side of the second gear in the third direction; and
a fourth catch tank on the first side of the second gear in the second direction and on the first side of the third gear in the third direction;
the first catch tank includes a first bent portion that is bent toward between the first gear and the second gear;
the second catch tank includes a second bent portion that is bent toward the second side in the third direction;
the third catch tank includes a third bent portion that is bent toward between the first gear and the second gear;
the fourth catch tank includes a fourth bent portion that is bent toward the second side in the third direction;

a space on the first side of the second bent portion in the third direction communicates with a space on the first side of the first bent portion in the third direction;

a space on the first side of the third bent portion in the third direction communicates with the space on the first side of the first bent portion in the third direction;

a space on the first side of the fourth bent portion in the third direction communicates with the space on the first side of the third bent portion in the third direction;

an oil storage portion in which oil is stored is provided in the housing at a portion of the housing on the second side in the third direction;

a portion of the first gear on the second side in the third direction is housed in the oil storage portion; and the space on the first side of the first bent portion in the third direction communicates with the oil storage portion.

2. The drive device according to claim 1, wherein the first bent portion includes a first inclined portion inclined to the first side in the second direction and to the first side in the third direction.

3. The drive device according to claim 1, wherein
the first bent portion includes a step;
a portion of the first bent portion on a first side in the first direction with respect to the step is located below a portion of the first bent portion on a second side in the first direction with respect to the step; and
the space on the first side of the first bent portion in the third direction communicates with the space on the first side of the second bent portion in the third direction on the first side in the first direction with respect to the step.

4. The drive device according to claim 1, wherein the second catch tank includes a first plate-shaped portion extending in a plane perpendicular to the first direction, and the first plate-shaped portion is on the second side of the second bent portion in the first direction.

5. The drive device according to claim 4, wherein
the housing includes:
a motor housing that houses the motor; and
a gear housing on the first side of the motor housing in the first direction; and
the second bent portion is provided on the gear housing.

6. The drive device according to claim 1, wherein
the power transmission includes a first bearing that supports the first gear; and
the second catch tank communicates with the first bearing.

7. The drive device according to claim 6, wherein
the housing includes a first rib protruding from an end of the housing on the first side in the first direction toward the second side in the first direction; and
the second catch tank communicates with the first bearing via the first rib.

8. The drive device according to claim 1, wherein
the power transmission includes a second bearing that supports the second gear; and
the first catch tank communicates with the second bearing.

9. The drive device according to claim 1, wherein the third bent portion includes a second inclined portion inclined to the first side in the second direction and to the first side in the third direction.

10. The drive device according to claim 1, wherein
the third catch tank includes a second plate-shaped portion extending in a plane perpendicular to the first direction; and
the second plate-shaped portion is disposed on the first side of the third bent portion in the first direction.

11. The drive device according to claim 10, wherein
the second plate-shaped portion includes a recess recessed toward the first side in the first direction; and
the third catch tank includes the recess.

12. The drive device according to claim 10, wherein
the housing includes:
a motor housing that houses the motor; and
a gear housing on the first side of the motor housing in the first direction; and
the third bent portion is provided on the motor housing.

13. The drive device according to claim 1, wherein a communication path that connects the third catch tank and the fourth catch tank is provided with an opening that opens toward the second gear.

14. The drive device according to claim 1, wherein
the fourth bent portion includes a third inclined portion inclined to the first side in the second direction and to the first side in the third direction; and
the fourth bent portion has, on a top portion, a through hole penetrating toward the second side in the third direction.

15. The drive device according to claim 1, wherein
the power transmission includes a third bearing that supports the third gear; and
the fourth catch tank communicates with the third bearing.

16. The drive device according to claim 1, wherein the housing includes a wall extending from a portion of the housing on the second side in the third direction to the first side in the second direction and to the first side in the third direction along an outer periphery of the first gear.

17. A vehicle comprising the drive device according to claim 1.

* * * * *